United States Patent
Ogawa et al.

(10) Patent No.: US 9,111,052 B2
(45) Date of Patent: Aug. 18, 2015

(54) CONTROL SYSTEM FOR CONTROLLING ELECTRONIC CIRCUIT, AND SIGNAL RELAYING APPARATUS

(71) Applicant: FUJITSU LIMITED, Kawasaki (JP)

(72) Inventors: Yuichi Ogawa, Kawasaki (JP); Nobuyoshi Kawagoe, Ishikawa (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 13/665,965

(22) Filed: Nov. 1, 2012

(65) Prior Publication Data

US 2013/0159585 A1 Jun. 20, 2013

(30) Foreign Application Priority Data

Dec. 20, 2011 (JP) ................................. 2011-278822

(51) Int. Cl.
| | |
|---|---|
| *G06F 13/14* | (2006.01) |
| *G06F 13/42* | (2006.01) |
| *G06F 13/38* | (2006.01) |
| *G06F 9/44* | (2006.01) |

(52) U.S. Cl.
CPC .......... *G06F 13/4291* (2013.01); *G06F 9/4411* (2013.01); *G06F 13/385* (2013.01)

(58) Field of Classification Search
USPC .................................. 710/104–110, 305–308
See application file for complete search history.

(56) References Cited

U.S. PATENT DOCUMENTS

| | | | |
|---|---|---|---|
| 6,253,267 B1 | 6/2001 | Kim et al. | |
| 7,089,338 B1 * | 8/2006 | Wooten et al. | 710/110 |
| 7,509,446 B2 * | 3/2009 | Hayashita | 710/110 |
| 7,536,492 B2 | 5/2009 | Cagno et al. | |
| 2006/0242348 A1 * | 10/2006 | Humphrey et al. | 710/305 |
| 2007/0103166 A1 * | 5/2007 | El Sayed | 324/522 |
| 2007/0240019 A1 * | 10/2007 | Brady et al. | 714/43 |

FOREIGN PATENT DOCUMENTS

| | | |
|---|---|---|
| JP | 2002-063080 | 2/2002 |
| JP | 2004-528627 | 9/2004 |
| JP | 2010-055474 | 3/2010 |
| WO | WO-02/063480 A2 | 8/2002 |

OTHER PUBLICATIONS

Extended European Search Report dated Mar. 14, 2013 for corresponding European Application No. 12192374.2.

* cited by examiner

*Primary Examiner* — Raymond Phan
(74) *Attorney, Agent, or Firm* — Fujitsu Patent Center

(57) ABSTRACT

A bus interface receives, via a bus, a control signal for controlling an electronic circuit, and outputs a signal corresponding to the received control signal to the electronic circuit. A signal maintaining circuit maintains the value of the signal to be output from the bus interface to the electronic circuit in accordance with an instruction from a reset control circuit. When the bus becomes unusable due to termination of operations of the control device or the like, the reset control circuit causes the signal maintaining circuit to maintain the value of the output signal to the electronic circuit, and subsequently resets the bus interface so as to restore the bus.

16 Claims, 12 Drawing Sheets

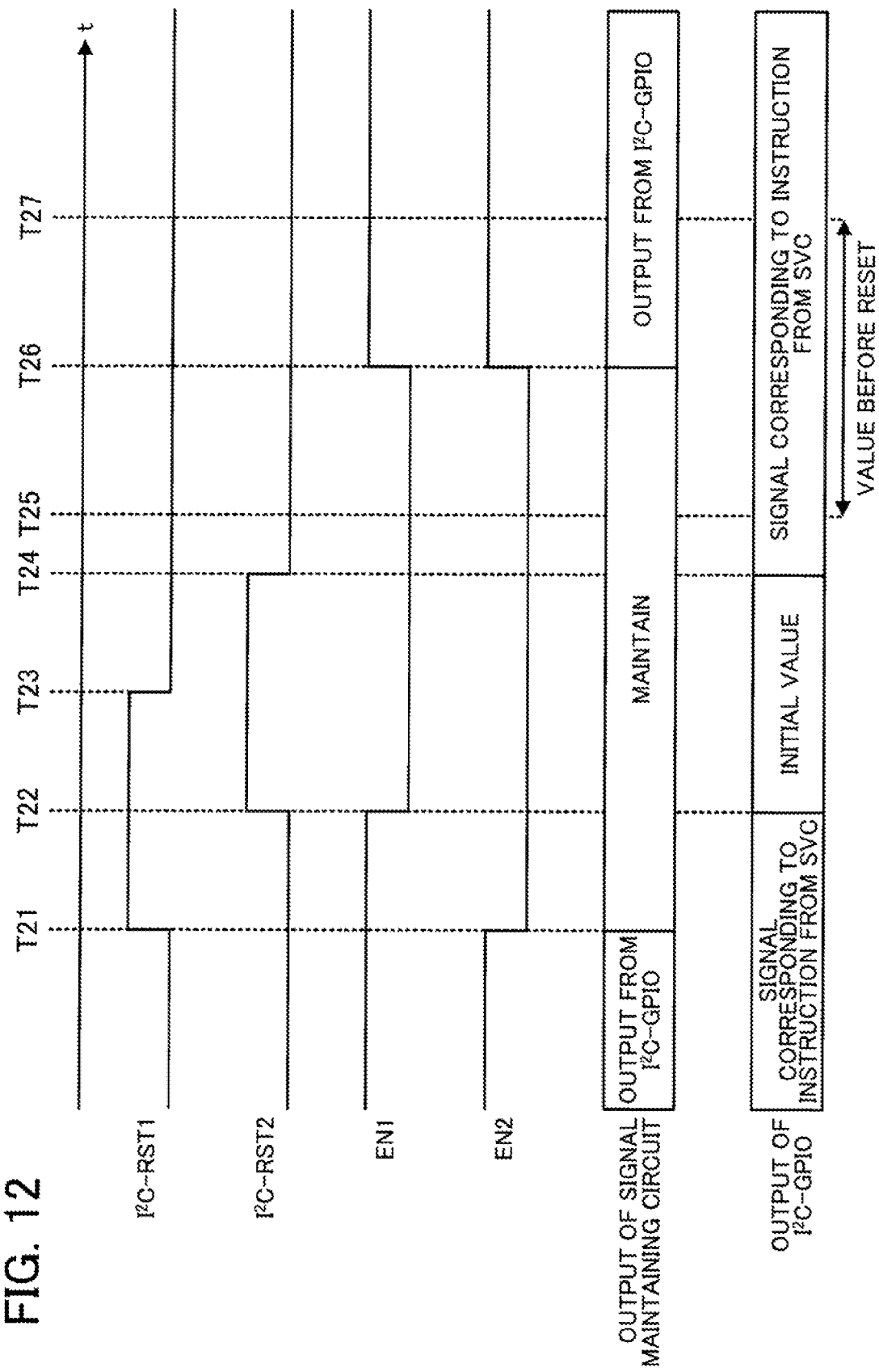

CONTROL SYSTEM FOR CONTROLLING ELECTRONIC CIRCUIT, AND SIGNAL RELAYING APPARATUS

CROSS-REFERENCE TO RELATED APPLICATION

This application is based upon and claims the benefit of priority of the prior Japanese Patent Application No. 2011-278822, filed on Dec. 20, 2011, the entire contents of which are incorporated herein by reference.

FIELD

The embodiments disclosed herein are related to a control system and a relay apparatus.

BACKGROUND

The Inter-Integrated Circuit ($I^2C$) bus is a bus for performing serial communication between a plurality of electronic circuits. The $I^2C$ bus is used for accessing a memory, reading detection values from various sensors such as a temperature sensor, and monitoring and controlling operations of an electronic circuit, for example.

In the case where one of a plurality of electronic circuits connected to a serial bus such as the $I^2C$ bus is abnormally terminated, the other electronic circuits might become unable to perform communication via the serial bus. As a technique for restoring communication via a serial bus from such a state, there has been disclosed a technique of resetting an electronic circuit connected to a serial bus by using a reset signal line that is provided separately from the serial bus (see, for example, Japanese Laid-open Patent Publication No. 2002-63080). There is also a system that includes a hang-up detection circuit between an electronic circuit and a serial bus. This system disconnects the electronic circuit from the serial bus when the hang-up detection circuit detects a hang-up of the electronic circuit (see, for example, Japanese Laid-open Patent Publication No. 2010-55474).

There is also another system that includes a plurality of switches on a serial bus. This system is configured to, if communication via the serial bus is disabled, turn off all the switches and then turn on the switches sequentially in the order from upstream so as to identify the location of the failure (see, for example, Japanese National Publication of International Patent Application No. 2004-528627).

By the way, in a system in which a control device controls operations of an electronic circuit via a bus, a bus interface for the electronic circuit receives a control signal from the control device via the bus, and outputs a signal corresponding to the received control signal to the electronic circuit. In the case where the bus becomes unusable in such a system, the bus may be restored by resetting the bus interface for the electronic circuit.

However, when the bus interface for the electronic circuit is reset, the output signal from the bus interface to the electronic circuit is lost. Therefore, even if there is no failure in the electronic circuit, the electronic circuit becomes unable to continue the last operation. For example, when the bus interface is reset, the electronic circuit is also reset.

SUMMARY

In one embodiment, there is provided a control system that includes an electronic circuit; a bus interface configured to receive, via a bus, a control signal for controlling the electronic circuit, and output a signal corresponding to the received control signal to the electronic circuit; a signal maintaining circuit configured to maintain a value of the signal to be output from the bus interface to the electronic circuit; a reset control circuit configured to cause the signal maintaining circuit to maintain the value of the output signal to the electronic circuit, and subsequently reset the bus interface; and a control device configured to control the electronic circuit by outputting the control signal via the bus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a sequence diagram illustrating an exemplary process performed in the case where a controller enclosure is powered on;

FIG. 10 is a timing chart illustrating an exemplary transition of the values of signals in the case where the controller enclosure is powered on;

FIG. 12 is a timing chart illustrating an exemplary transition of the values of signals in the case where the active service controller is abnormally terminated.

DESCRIPTION OF EMBODIMENTS

Figure 1:
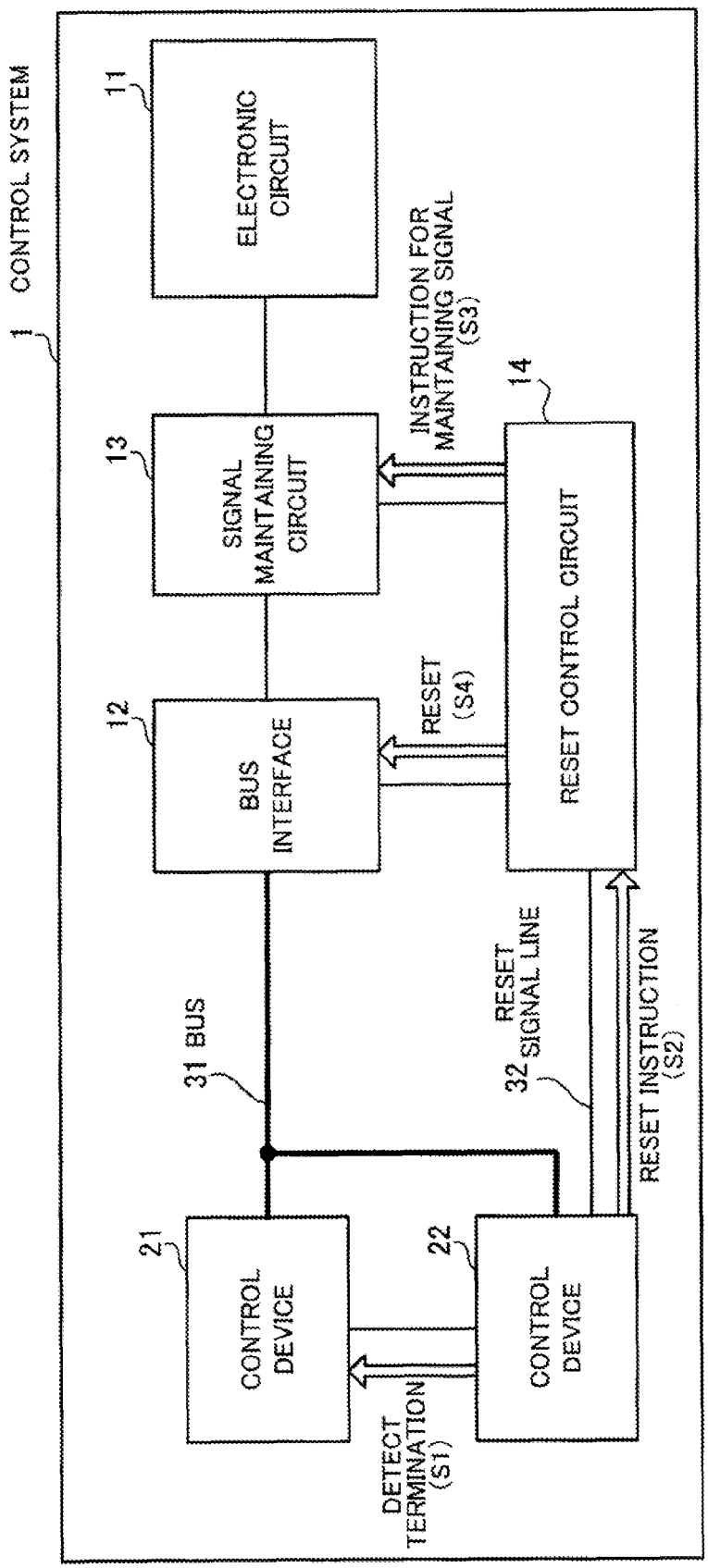
FIG. 1 illustrates an exemplary configuration of a control system and exemplary operations thereof according to a first embodiment.

Several embodiments will be described below with reference to the accompanying drawings, wherein like reference numerals refer to like elements throughout.

(A) First Embodiment

FIG. 1 illustrates an exemplary configuration of a control system 1 and exemplary operations thereof according to a first embodiment. The control system 1 of FIG. 1 includes an electronic circuit 11, a bus interface 12, a signal maintaining circuit 13, a reset control circuit 14, and a control device. The control system 1 of FIG. 1 includes two control devices 21 and 22, for example.

The electronic circuit 11 is a circuit to be controlled by the control devices 21 and 22. The control devices 21 and 22 control the electronic circuit 11 by transmitting a control signal via a bus 31. In the present embodiment, one of the control devices 21 and 22 operates as an active control device, and the other operates a standby control device, for example.

The bus 31 is a serial bus such as an I²C bus. The bus 31 is connected to the bus interface 12. The bus interface 12 receives a control signal transmitted from the active control device via the bus 31, and outputs a signal corresponding to the received control signal to the electronic circuit 11.

The signal maintaining circuit 13 is disposed in a transmission path of the signal that is output from the bus interface 12 to the electronic circuit 11. The signal maintaining circuit 13 maintains, in accordance with an instruction from the reset control circuit 14, the value of the signal to be output from the bus interface 12 to the electronic circuit 11 at the value at the time of the reception of the instruction from the reset control circuit 14.

The reset control circuit 14 is configured to, when the bus 31 becomes unusable, cause the signal maintaining circuit 13 to maintain the value of the output signal to the electronic circuit 11, and then resets the bus interface 12. When the bus interface 12 is reset, the bus 31 is restored to an operational state. The above operation of the reset control circuit 14 prevents the signal output from the bus interface 12 to the electronic circuit 11 from being lost due to the resetting of the bus interface 12. This allows the electronic circuit 11 to continue operations until the bus 31 is restored.

The following describes, step by step, the operations performed in the control system 1 in the case where an active control device is terminated due to the occurrence of a failure and thus the bus 31 becomes unusable.

In the following example, the control device 21 operates as an active control device, and the control device 22 operates as a standby control device in the initial state. In the case where the operations of the control device 21 operating as an active control device 21 are stopped, the standby control device 22 becomes active and controls the electronic circuit 11 in place of the control device 21. The control device 22 and the reset control circuit 14 are connected to each other with a reset signal line 32 for instructing resetting of the bus interface 12.

When the control device 21 operating as an active control device and the bus interface 12 are communicating with each other via the bus 31, if the control device 21 is terminated due to the occurrence of a failure or the like, the bus 31 is prevented from being released. Accordingly, the control device 22 is unable to perform communication via the bus 31, and thus is unable to take over control of the electronic circuit 11.

When the control device 22 detects that the control device 21 has been terminated (Step S1), the control device 22 outputs a reset instruction via the reset signal line 32 (Step S2). Upon receiving the reset instruction, the reset control circuit 14 instructs the signal maintaining circuit 13 to maintain the value of an output signal to the electronic circuit (Step S3). The signal maintaining circuit 13 maintains the value of the signal being output from the bus interface 12 to the electronic circuit 11 at the time of reception of the instruction from the reset control circuit 14 without any change. Since the value of the signal that is input to the electronic circuit 11 is maintained, the electronic circuit 11 is able to continue operations in the same controlled state as it was before the termination of the control device 21.

After instructing the signal maintaining circuit 13 to maintain the output value, the reset control circuit resets the bus interface 12 (Step S4). For instance, the reset control circuit 14 resets the bus interface 12 after a predetermined time period after reception of the reset instruction via the reset signal line 32.

When the bus interface 12 is reset, the bus 31 is released. The control device 22 transmits a control signal via the bus 31, and thereby controls the electronic circuit 11 in place of the control device 21. When the control device 22 starts controlling the electronic circuit 11, the signal maintaining circuit 13 is released from a state of maintaining the output value, in accordance with an instruction from the reset control circuit 14, for example. Then, a signal corresponding to the control signal from the control device 22 is transmitted from the bus interface 12 to the electronic circuit 11.

According to the control system 1 described above, in the case where the bus 31 becomes unusable due to the termination of the operations of the control device 22, the bus 31 may be restored by resetting the bus interface 12 while keeping the electronic circuit 11 operating. Further, the control device 22 may take over control of the electronic circuit 11 from the control device 21 while keeping the electronic circuit 11 operating.

(B) Second Embodiment

Figure 2:
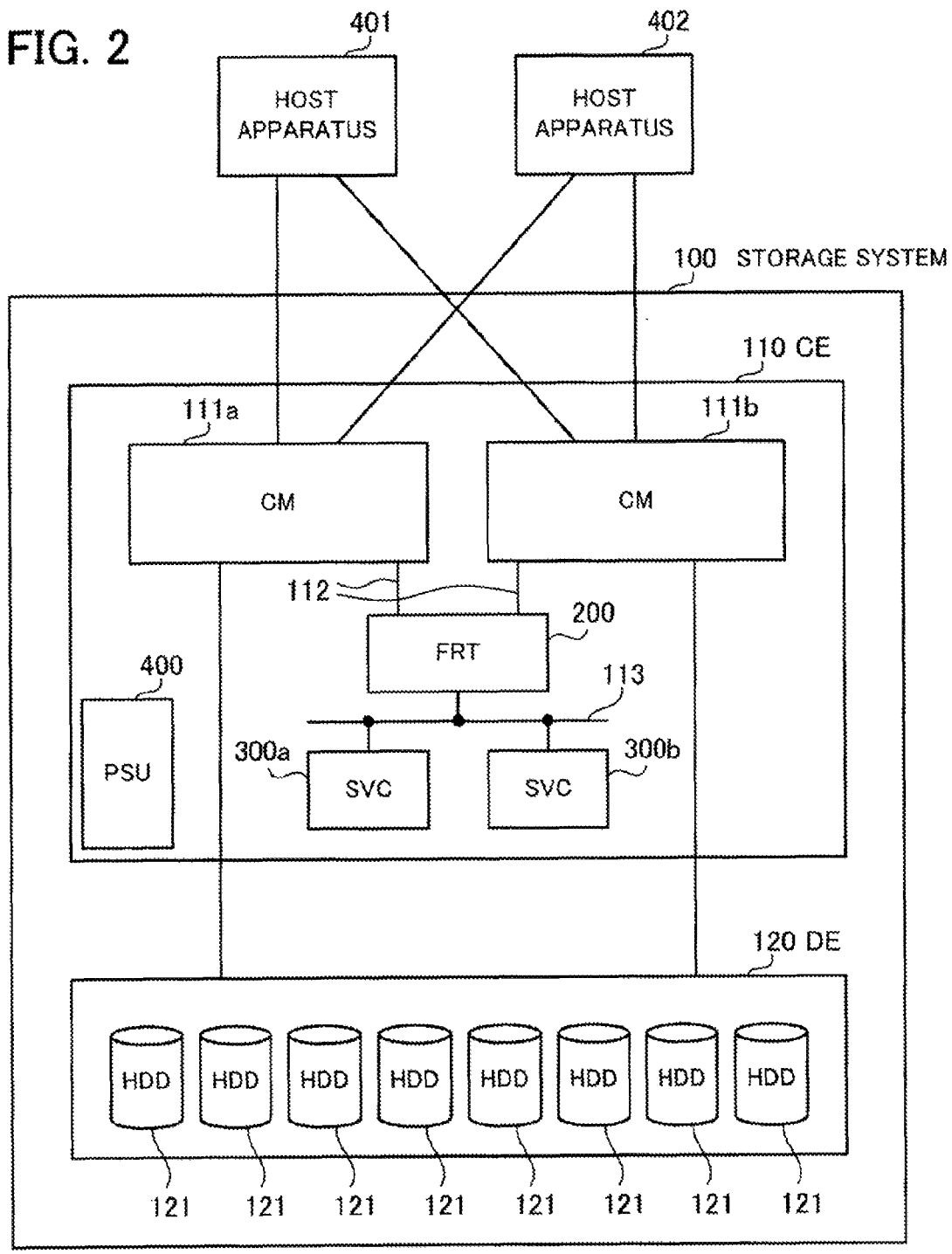
FIG. 2 illustrates an exemplary entire configuration of a storage system according to a second embodiment.

FIG. 2 illustrates an exemplary entire configuration of a storage system 100 according to a second embodiment. The storage system 100 includes a controller enclosure (CE) 110 and a drive enclosure (DE) 120.

The controller enclosure 110 includes controller modules (CMs) 111a and 111b, a front-end router (FRT) 200, service controllers (SCs) 300a and 300b, and a power supply unit (PSU) 400.

Each of the controller modules 111a and 111b is implemented as a computer apparatus which includes a central processing unit (CPU) and a memory. Further, each of the controller modules 111a and 111b is connected to host apparatuses 401 and 402.

Each of the controller modules 111a and 111b is configured to read data from and write data to storage devices included in the drive enclosure 120 in response to an In/Out (I/O) request from the host apparatuses 401 and 402. The controller modules 111a and 111b manage physical storage areas, which are implemented as the storage devices of the drive enclosure 120, using Redundant Arrays of Inexpensive Disks (RAID), and control access to these physical storage areas, for example. Further, when controlling access to the storage devices of the drive enclosure 120 in response to an I/O request from the host apparatuses 401 and 402, the controller modules 111a and 111b cache a part of data stored in the storage devices of the drive enclosure 120 into memories of the controller modules 111a and 111b.

The front-end router 200 is connected to the controller modules 111a and 111b through a Peripheral Components Interconnect express (PCIe) bus 112. The front-end router 200 includes a PCIe switch and is configured to relay data that is exchanged between the controller modules 111a and the controller module 111b via the PCIe bus 112.

The controller modules 111a and 111b may communicate with each other via the front-end router 200. For example, the controller module 111a loads the cached data, which has been cached from the storage device of the drive enclosure 120 into a memory of the controller module 111a, into a memory of the other controller module 111b, and thereby duplicates the cached data. In this case, if the controller module 111a is terminated due to the occurrence of a failure, the controller module 111b may take over, using the duplicated cached data in the memory of the controller module 111b, the operation of controlling access to the drive enclosure 120 which has been performed by the controller module 111a.

The front-end router 200 is connected to the service controllers 300a and 300b through an I²C bus 113. The service controllers 300a and 300b control operations of the PCIe switch of the front-end router 200, and monitor the operations of the PCIe switch. The service controllers 300a and 300b and the front-end router 200 realize a control system for controlling the PCIe switch of the front-end router 200.

The service controllers 300a and 300b operate as master devices in the I²C bus 113. A bus interface of the front-end router 200 for the I²C bus 113 operates as a slave device in the I²C bus 113. The service controllers 300a and 300b have the same function. One of the service controllers 300a and 300b operates as an active service controller, and the other operates as a standby service controller. In this embodiment, the service controller 300a operates as an active service controller, and the service controller 300b operates as a standby service controller in the initial state.

The service controller 300b operating as a standby service controller monitors whether the service controller 300a is operating normally. If the service controller 300b detects that the service controller 300a has been abnormally terminated, the service controller 300b starts operating as an active service controller so as to take over the operation of controlling the operations of the PCIe switch of the front-end router 200 and the operation of monitoring the PCIe switch.

The power supply unit 400 converts an externally supplied alternating current (AC) supply voltage into a direct current (DC) voltage, and supplies the DC voltage to the components of the controller enclosure 110.

The drive enclosure 120 includes a plurality of storage devices to be accessed by the controller modules 111a and 111b. The drive enclosure 120 of this embodiment is a disk array apparatus including hard disk drives (HDDs) or solid state drives (SSDs) as storage devices.

Figure 3:
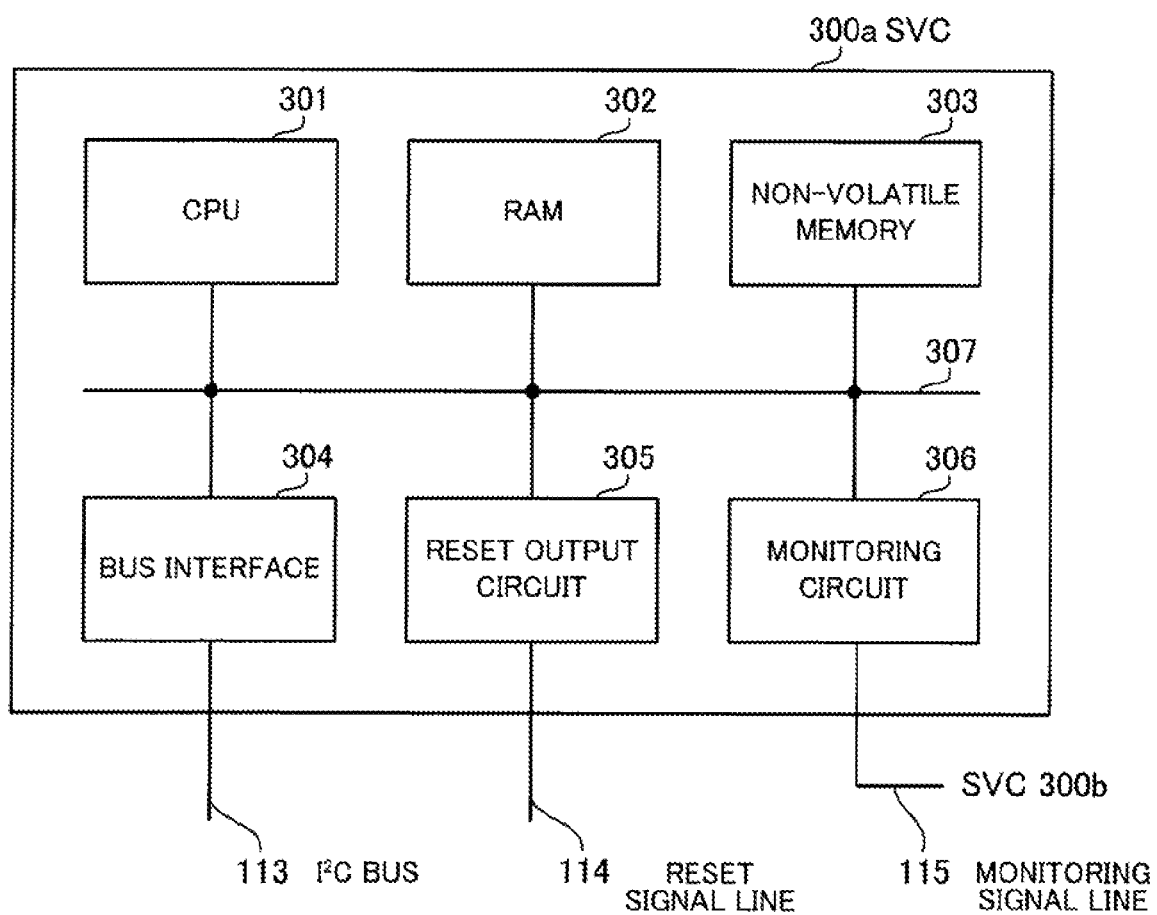
FIG. 3 illustrates an exemplary hardware configuration of a service controller.

FIG. 3 illustrates an exemplary hardware configuration of the service controller 300a. It is to be noted that both the service controllers 300a and 300b have the same hardware configuration, and therefore the following describes only the service controller 300a.

The entire operation of the service controller 300a is controlled by a CPU 301. A random access memory (RAM) 302 and a plurality of peripheral devices are connected to the CPU 301 through a bus 307. The RAM 302 is used as a primary storage device of the service controller 300a. The RAM 302 temporarily stores at least part of a firmware program to be executed by the CPU 301, and various types of data used for processing to be performed by this firmware program.

As examples of peripheral devices, a non-volatile memory 303, a bus interface 304, a reset output circuit 305, and a monitoring circuit 306 are connected to the CPU 301.

The non-volatile memory 303 is used as a secondary storage device of the service controller 300a, and is configured to store the firmware program to be executed by the CPU 3011, various types of data used for execution of the firmware program, and the like.

The bus interface 304 performs interface processing for exchanging data via the I²C bus 113. The I²C bus 113 includes a data signal line and a clock signal line. The bus interface 304 transmits control data via the data signal line and receives response data transmitted from the slave device (the bus interface of the front-end router 200) via the data signal line, under the control of the CPU 301. Further, the bus interface 304 outputs a clock signal to the clock signal line when sending the control data and when receiving the response data.

Further, a reset signal line 114 for instructing resetting of the bus interface is connected to the service controller 300a. The reset output circuit 305 outputs a reset instruction signal to the reset signal line 114 in accordance with an instruction from the CPU 301.

The service controller 300a and the service controller 300b are connected to each other through a monitoring signal line 115 for monitoring each other. The monitoring circuit 306 exchanges monitoring signals with a monitoring circuit of the other service controller 300b via the monitoring signal line 115. For example, the CPU of a service controller operating as an active service controller causes a monitoring circuit of the active service controller to transmit a monitoring signal at a constant frequency to the other service controller operating as a standby service controller. The monitoring circuit of the standby service controller having received the monitoring signal from the active service controller notifies the CPU of the standby service controller of the reception of the monitoring signal. If the monitoring circuit of the standby service controller does not receive a monitoring signal for a certain period of time or longer, the CPU of the standby service controller determines that the active service controller is abnormally terminated.

Figure 4:
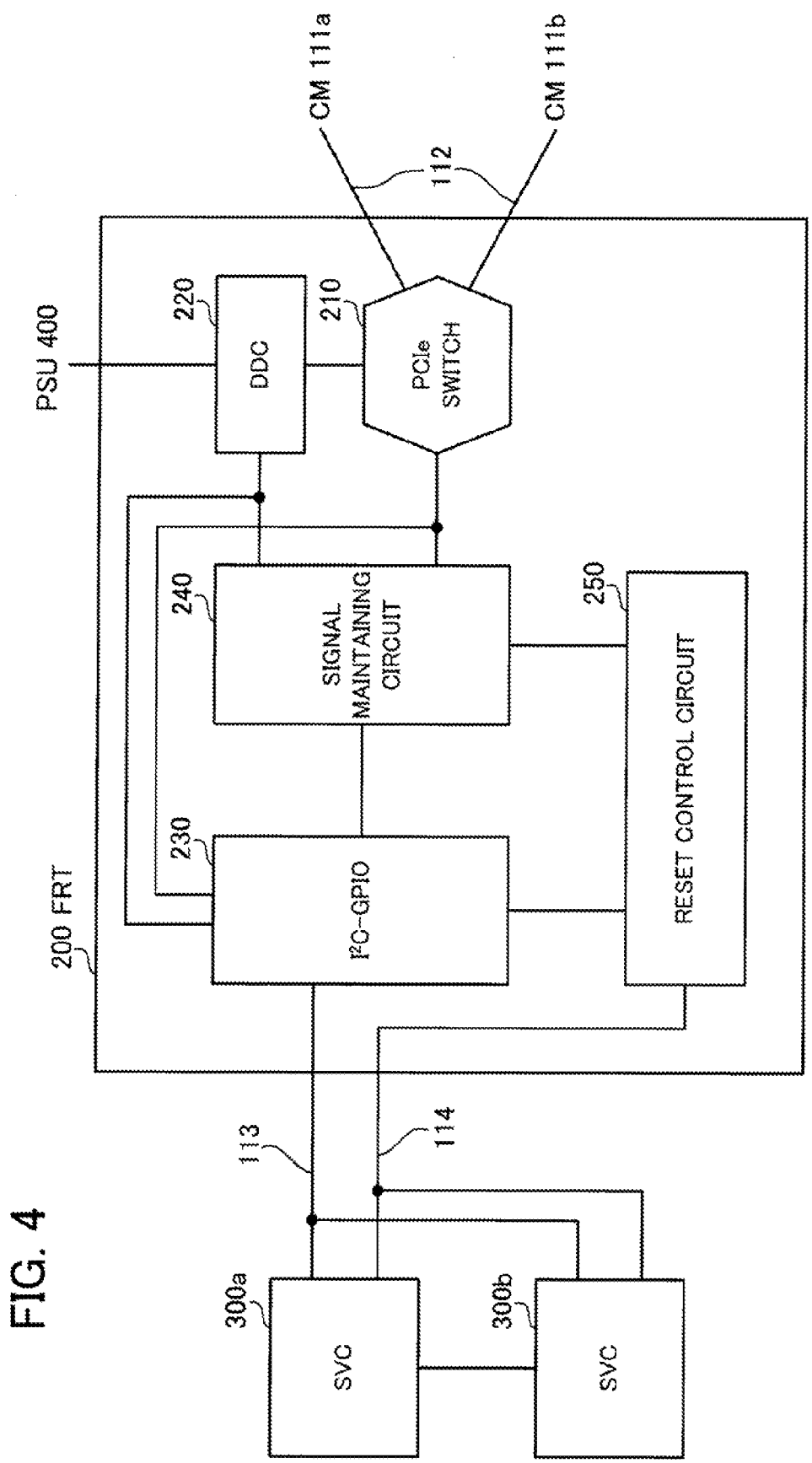
FIG. 4 illustrates an exemplary hardware configuration of a front-end router.

FIG. 4 illustrates an exemplary hardware configuration of the front-end router 200. The front-end router 200 includes a PCIe switch 210, a DC/DC converter (DDC) 220, an I²C-GPIO (General Purpose Input/Output) 230, a signal maintaining circuit 240, and a reset control circuit 250.

The PCIe switch 210 is configured to relay data that are exchanged between the controller modules 111a and the controller module 111b via the PCIe bus 112. Further, the PCIe switch 210 may exchange signals with the I²C-GPIO 230. The PCIe switch 210 executes an operation corresponding to a control signal from the I²C-GPIO 230, and returns information requested by the I²C-GPIO 230. For example, the PCIe switch 210 resets itself in accordance with a reset instruction from the I²C-GPIO 230. Also, the PCIe switch 210 returns information indicating the state of the PCIe switch 210, such as temperature information and drive voltage information, in response to a request from the I²C-GPIO 230.

The DC/DC converter 220 converts a DC voltage from the power supply unit 400 into a predetermined voltage, and supplies the predetermined voltage to the PCIe switch 210 as a drive voltage. Further, the on and off of the DC/DC converter 220 is controlled in accordance with a control signal (a power-on signal described below) that is output from the I²C-GPIO 230.

The I²C-GPIO 230 is a bus interface circuit for the I²C bus 113. The I²C-GPIO 230 operates as a slave circuit on the I²C bus 113, and is configured to receive a control signal from one of the service controllers 300a and 300b via the I²C bus 113, and transmits a response signal in response to the received control signal.

Further, the I²C-GPIO 230 having received control signal from one of the service controllers 300a and 300b via the I²C bus 113 converts the received control signal into a control signal to be used in the front-end router 200, and transmits the converted control signal to the PCIe switch 210 or the DC/DC converter 220. For example, if the I²C-GPIO 230 receives an instruction for turning off the DC/DC converter 220 via the I²C bus 113, the I²C-GPIO 230 switches the power-on signal to be transmitted to the DC/DC converter 220 from high level to low level.

Also, the I²C-GPIO 230 may load a signal transmitted to the PCIe switch 210 and the DC/DC converter 220 from the signal maintaining circuit 240 in accordance with an instruction from any one of the service controllers 300a and 300b.

Further, the I²C-GPIO 230 is reset when a reset signal output from the reset control circuit 250 is switched from low level to high level. As will be described below, in the case where the service controller communicating with the I²C-GPIO 230 is abnormally terminated or in the case where the I²C-GPIO 230 is abnormally terminated, communication via the I²C bus 113 is disabled. Then, if the I²C-GPIO 230 is reset, the I²C bus 113 is restored. This enables communication between the I²C-GPIO 230 and one of the service controllers 300a and 300b via the I²C bus 113.

The signal maintaining circuit 240 is disposed in a transmission path of a signal that is transmitted from the I²C-GPIO 230 to the PCIe switch 210 and the DC/DC converter 220. The signal maintaining circuit 240 maintains the values of the signals to be transmitted from the I²C-GPIO 230 to the PCIe switch 210 and the DC/DC converter 220 at the values at the time of the reception of an instruction from the reset control circuit 250.

The reset control circuit 250 is connected to the service controllers 300a and 300b through the reset signal line 114. When the reset control circuit 250 receives an instruction for resetting the I²C-GPIO 230 via the reset signal line 114, the reset control circuit 250 causes the signal maintaining circuit 240 to maintain the values of the output signals, and delays the timing of resetting the I²C-GPIO 230. With this operation, the reset control circuit 250 prevents the operations of the PCIe switch 210 from being stopped before completion of the reset operation of the I²C-GPIO 230 due to loss of the signals to the PCIe switch 210 and the DC/DC converter 220 from the I²C-GPIO 230.

Figure 5:
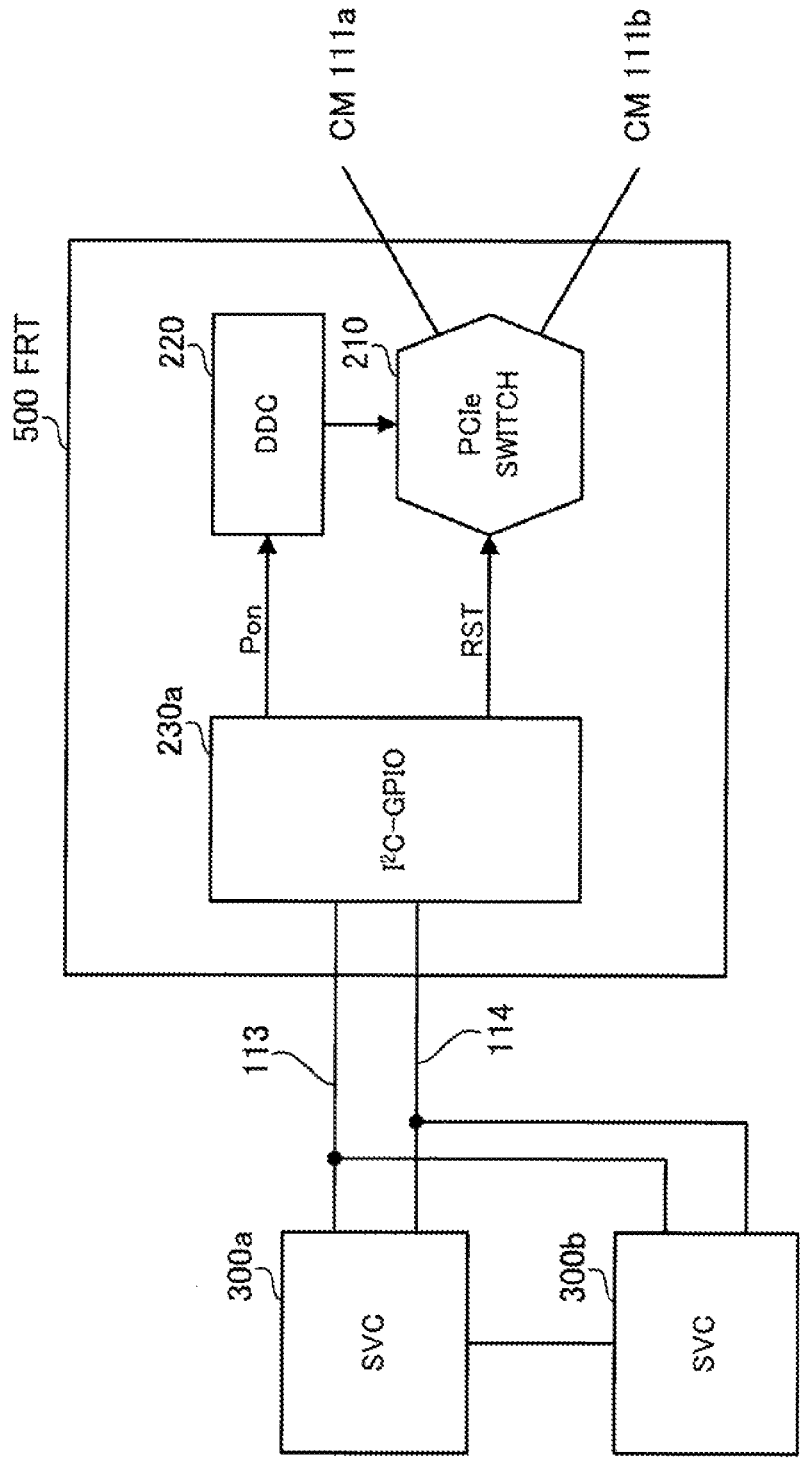
FIG. 5 illustrates a reference example of a front-end router.

FIG. 5 illustrates a reference example of a front-end router. A description will be given of the problem which may occur in the case where an I²C bus 113 becomes unusable with reference to FIG. 5. In FIG. 5, elements corresponding to those of FIG. 4 are denoted by the same reference numerals.

A front-end router 500 illustrated in FIG. 5 is an example in which the signal maintaining circuit 240 and the reset control circuit 250 of the front-end router 200 are not provided. That is, output signals from an I²C-GPIO 230a are transmitted to a PCIe switch 210 and a DC/DC converter 220 without passing through the signal maintaining circuit 240. The I²C-GPIO 230a is different from the I²C-GPIO 230 of FIG. 4 in not having a function of loading an output signal from the signal maintaining circuit 240. Further, the I²C-GPIO 230a is directly connected to a reset signal line 114, and is reset in accordance with an instruction transmitted via the reset signal line 114.

In FIG. 5, a reset signal RST for instructing resetting is illustrated as an example of a control signal that is output from the I²C-GPIO 230a to the PCIe switch 210. For example, the PCIe switch 210 is reset when the reset signal RST is switched from high level to low level.

Further, in FIG. 5, a power-on signal Pon for controlling an operation of supplying a drive voltage to the PCIe switch 210 is illustrated as an example of a control signal that is output from the I²C-GPIO 230a to the DC/DC converter 220. For example, the DC/DC converter 220 supplies a drive voltage to the PCIe switch 210 when the power-on signal Pon is high level, and stops supplying the drive voltage to the PCIe switch 210 when the power-on signal Pon is low level.

The following describes operations in the case where the service controllers 300a and 300b are connected to the above-described front-end router 500. In the following description, it is assumed that the service controller 300a having been operating as an active service controller is abnormally terminated. When the service controller 300b operating as a standby service controller detects that the service controller 300a has been abnormally terminated, the service controller 300b attempts to become active so as to take over the operation of controlling the operations of the PCIe switch 210 of the front-end router 500 and the operation of monitoring the PCIe switch 210. However, since the service controller 300a has been terminated, the I²C bus 113 is prevented from being released. Thus, the service controller 300b is not able to perform communication via the I²C bus 113.

For example, when the service controller 300a operating as a master device on the I²C bus 113 is terminated, transmission of a clock signal to a clock signal line of the I²C bus 113 is stopped. If transmission of a clock signal is stopped when the I²C-GPIO 230a operating as a slave device is transmitting data, the data transmission operation by the I²C-GPIO 230a is stopped. Then, the potential of a data signal line is fixed to either high level or low level. Thus, the I²C bus 113 becomes unusable, the service controller 300b having become active is not able to perform communication via the I²C bus 113.

Then, the service controller 300b instructs resetting of the I²C-GPIO 230a via the reset signal line 114. When the I²C-GPIO 230a is reset, the I²C bus 113 is restored. However, when the I²C-GPIO 230a is reset, output signals from the I²C-GPIO 230a to the PCIe switch 210 and the DC/DC converter 220 are lost. Therefore, even if there is no failure in the PCIe switch 210, the PCIe switch 210 becomes unable to continue the last operation.

For instance, if the reset signal RST becomes low level due to resetting of the I²C-GPIO 230a, the PCIe switch 210 is also reset. Further, if the power-on signal Pon becomes low level due to resetting of the I²C-GPIO 230a, supply of a drive voltage to the PCIe switch 210 is stopped. In both cases, the operations of the PCIe switch 210 are stopped. When the PCIe switch 210 is terminated, the controller module 111a and the controller module 111b become unable to communicate with each other, and thus become unable to duplicate of cached data, for example. This affects operations of the storage system 100.

In order to overcome the above problem, in the front-end router 200 of FIG. 4 of this embodiment, when a reset instruction is issued from the service controller 300b, the reset control circuit 250 causes the signal maintaining circuit 240 to maintain the values of the output signals to the PCIe switch 210 and the DC/DC converter 220 before resetting the I²C-GPIO 230. This prevents the output signals to the PCIe switch 210 and the DC/DC converter 220 from being lost due to the resetting of the I²C-GPIO 230, and thereby allows the PCIe switch 210 to continue operations even during the reset process of the I²C-GPIO 230.

Figure 6:
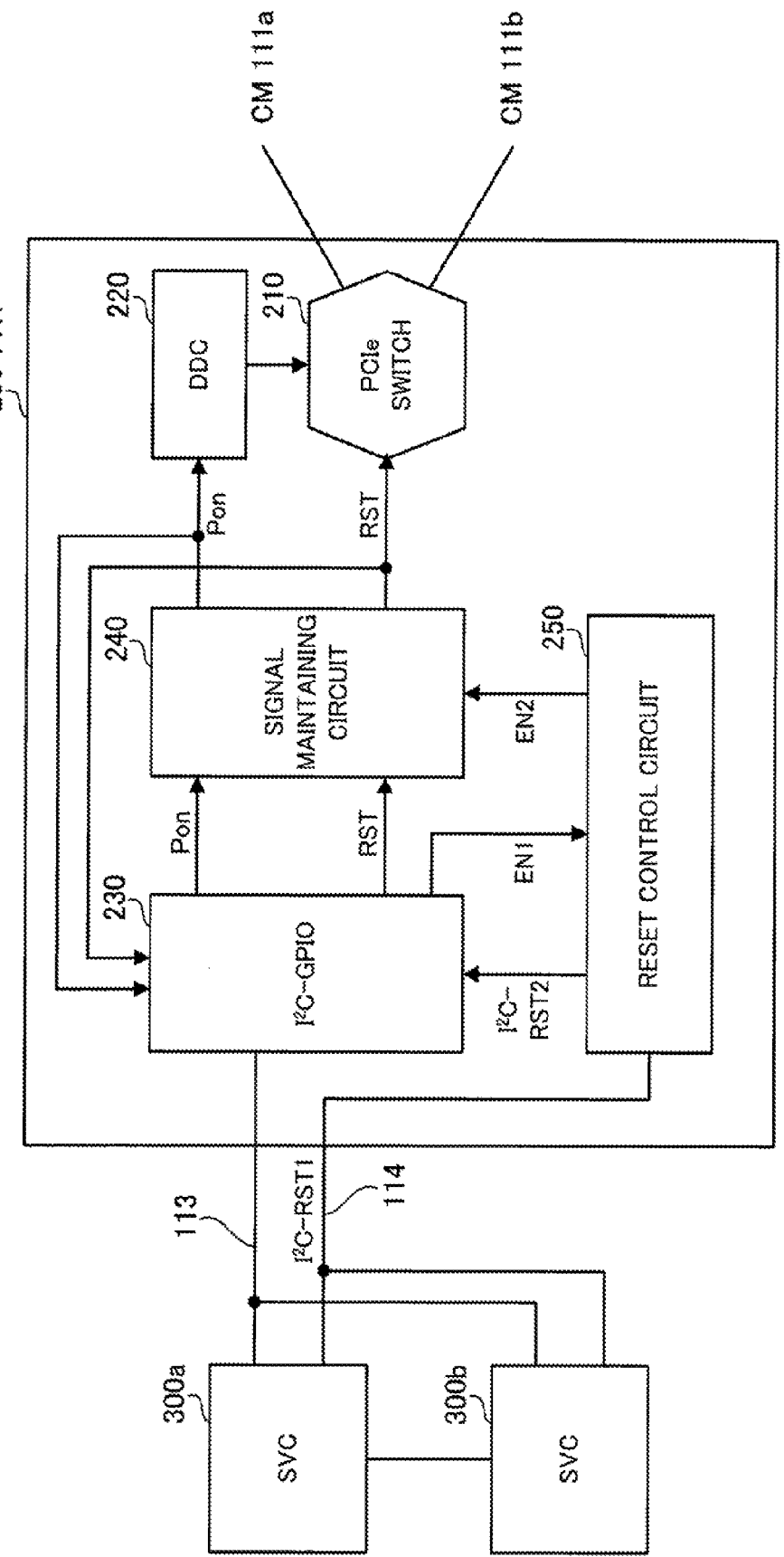
FIG. 6 illustrates an example of a signal transmitted within the front-end router.

FIG. 6 illustrates an example of a signal transmitted within the front-end router 200.

In the following description, a reset signal RST and a power-on signal Pon are illustrated as examples of control signals output by the I²C-GPIO 230. The reset signal RST is supplied to the PCIe switch 210 via the signal maintaining circuit 240, and the power-on signal Pon is supplied to the DC/DC converter 220 via the signal maintaining circuit 240. The PCIe switch 210 is reset when the reset signal RST is switched from high level to low level. The DC/DC converter 220 supplies a drive voltage to the PCIe switch 210 when the power-on signal Pon is high level, and stops supplying the drive voltage to the PCIe switch 210 when the power-on signal Pon is low level.

The signal maintaining circuit 240 outputs control signals (in this example, the reset signal RST and the power-on signal Pon) that are output from the I²C-GPIO 230 without any change when an enable signal EN2 is high level. When the enable signal EN2 is low level, the signal maintaining circuit 240 maintains the values of the control signals that had been output from the I²C-GPIO 230 at the time the enable signal EN2 was switched to low level, until the enable signal EN2 becomes high level.

The I²C-GPIO 230 is reset when a reset signal I²C-RST2 from the reset control circuit 250 is switched from low level to high level. Further, when the I²C-GPIO 230 receives an instruction from the service controller via the I²C bus 113, the I²C-GPIO 230 switches an enable signal EN1 to be output to the reset control circuit 250 to low level or high level. When the I²C-GPIO 230 is operating normally, the enable signal EN1 is high level. Also, the I²C-GPIO 230 loads the control signals (in this example, the reset signal RST and the power-on signal Pon) being output from the signal maintaining circuit 240, and outputs control signals corresponding to the values of the loaded signals.

The reset control circuit 250 receives a reset signal I²C-RST1 via the reset signal line 114. The reset control circuit 250 delays the input value of the reset signal I²C-RST1 by a predetermined time, and outputs the delayed reset signal I²C-RST1 as a reset signal I²C-RST2 to the I²C-GPIO 230.

Further, when the reset signal I²C-RST1 is switched from low level to high level, the reset control circuit 250 switches the enable signal EN2 from high level to low level and causes the signal maintaining circuit 240 to maintain the output value. After that, when the enable signal EN1 from the I²C-GPIO 230 having been reset is switched from low level to high level, the reset control circuit 250 switches the enable signal EN2 to high level.

Figure 7:
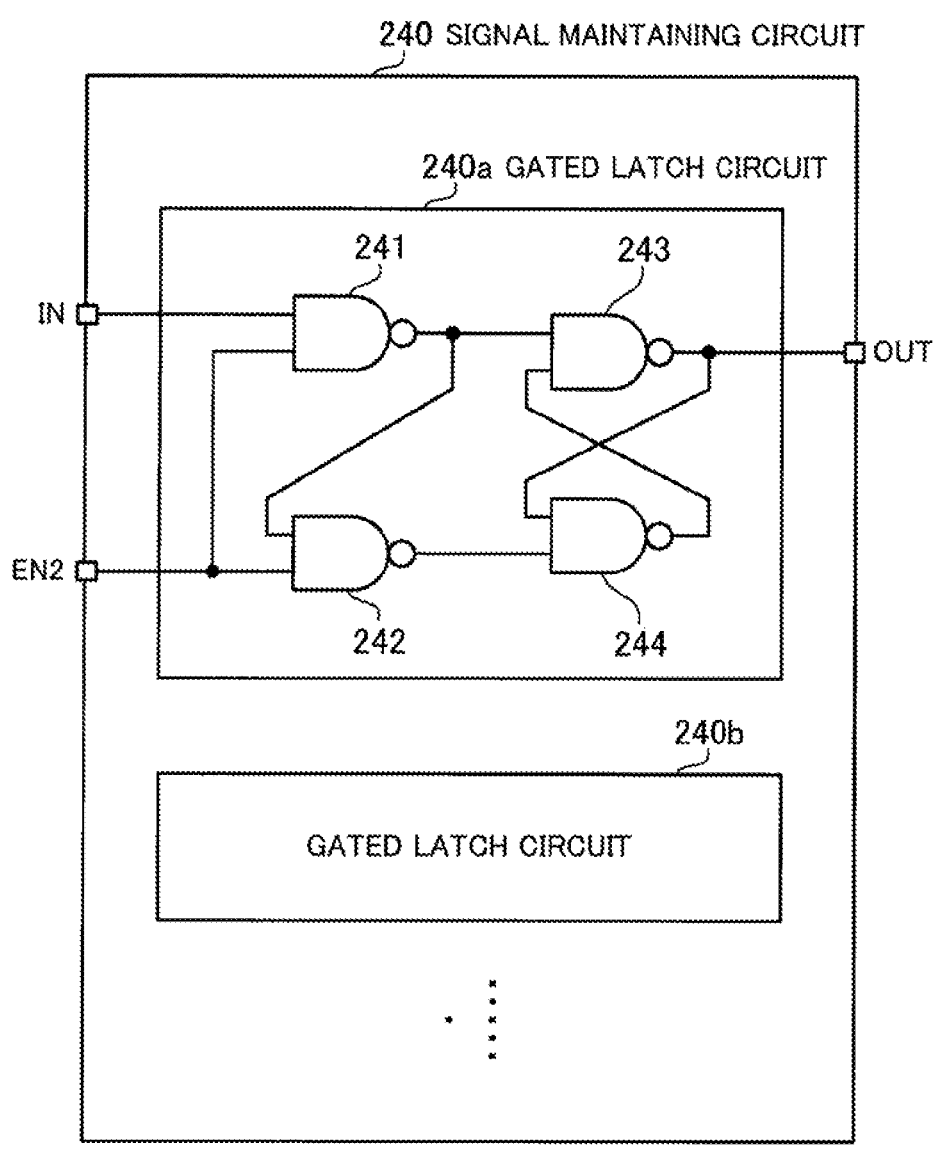
FIG. 7 illustrates an exemplary internal configuration of a signal maintaining circuit.

FIG. 7 illustrates an exemplary internal configuration of the signal maintaining circuit 240. The signal maintaining circuit 240 includes the same number of gated latch circuits 240a, 240b, . . . as the number of control signals whose output values are to be maintained, for example.

The gated latch circuit 240a includes four NAND (negative AND) gates 241 through 244. The NAND gate 241 has one input terminal IN to which the control signal from the I²C-GPIO 230 is input and the other input terminal to which the enable signal EN2 from the reset control circuit 250 is input. The NAND gate 242 has one input terminal to which an output signal from the NAND gate 241 is input and the other input terminal to which the enable signal EN2 from the reset control circuit 250 is input. The NAND gate 243 has one input terminal to which the output signal from the NAND gate 241 is input and the other input terminal to which an output signal from the NAND gate 244 is input. The NAND gate 244 has one input terminal to which an output signal from the NAND gate 243 is input and the other input terminal to which an output signal from the NAND gate 242 is input. The output signal from the NAND gate 243 is output from an output terminal OUT.

In the gated latch circuit 240a having the configuration described above, when the enable signal EN2 is high level, the output value from the out terminal OUT is the same as the value of the control signal input to the input terminal IN. On the other hand, when the enable signal EN2 is low level, the output value from the output terminal OUT is maintained at the value of the control signal input to the input terminal IN at the time the enable signal EN2 was switched to low level.

It is to be noted that a common enable signal EN2 is input to each of the gated latch circuits 240a, 240b, . . . of the signal maintaining circuit 240. It is noted that the gated latch circuit may have any other circuit configuration.

Figure 8:
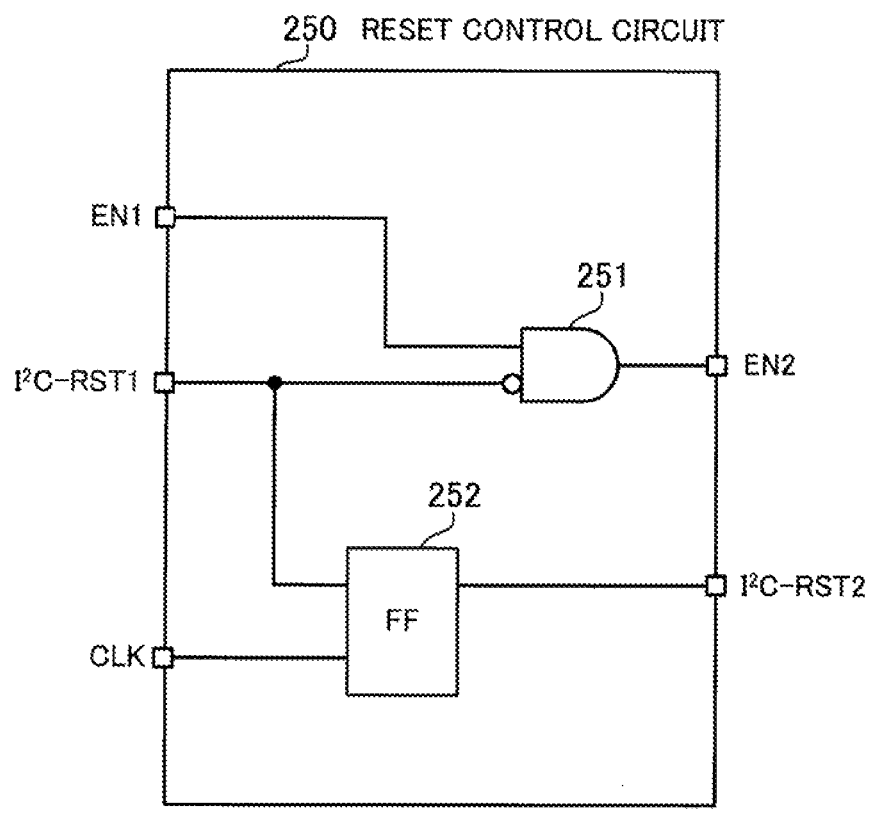
FIG. 8 illustrates an exemplary internal configuration of a reset control circuit.

FIG. 8 illustrates an exemplary internal configuration of the reset control circuit 250. The reset control circuit 250 includes an AND (logical AND) gate 251 and a flip-flop (FF) 252.

The AND gate 251 has one input terminal to which the enable signal EN1 from the I²C-GPIO 230 is input and the other input terminal to which an inverted signal of the reset signal I²C-RST1 is input. An output signal from the AND gate 251 is output as an enable signal EN2 to the signal maintaining circuit 240.

This AND gate 251 changes the level of the enable signal EN2 as follows. If the enable signal EN1 is high level and the reset signal I²C-RST1 is low level, the enable signal EN2 becomes high level. If the enable signal EN1 is low level or if the reset signal I²C-RST1 is low level, the enable signal EN2 becomes low level. Similarly, if both of these conditions are satisfied, the enable signal EN2 becomes low level. It is to be noted that the circuit configuration of the reset control circuit 250 is not limited to that of FIG. 8 as long as the enable signal EN1, the reset signal I²C-RST1, and the enable signal EN2 interlock each other as described above.

The flip-flop 252 has a data input terminal to which the reset signal I²C-RST1 is input via the reset signal line 114, and has a clock input terminal to which a clock signal CLK is input. The clock signal CLK is generated in the controller enclosure 110, for example. The flip-flop 252 delays the reset signal I²C-RST1 by a time period corresponding to the period of the clock signal CLK, and outputs the delayed reset signal I²C-RST1 as a reset signal I²C-RST2 to the I²C-GPIO 230.

It is to be noted that the reset control circuit 250 may include a plurality of serially connected flip-flops so as to delay the reset signal I²C-RST1 by a predetermined time, for example. Alternatively, the reset control circuit 250 may include other types of delay circuits than the flip-flop as a circuit for delaying the reset signal I²C-RST1.

Next, operations of the service controllers 300a and 300b and the front-end router 200 will be described with reference to a sequence diagram and a timing chart.

Figure 9:
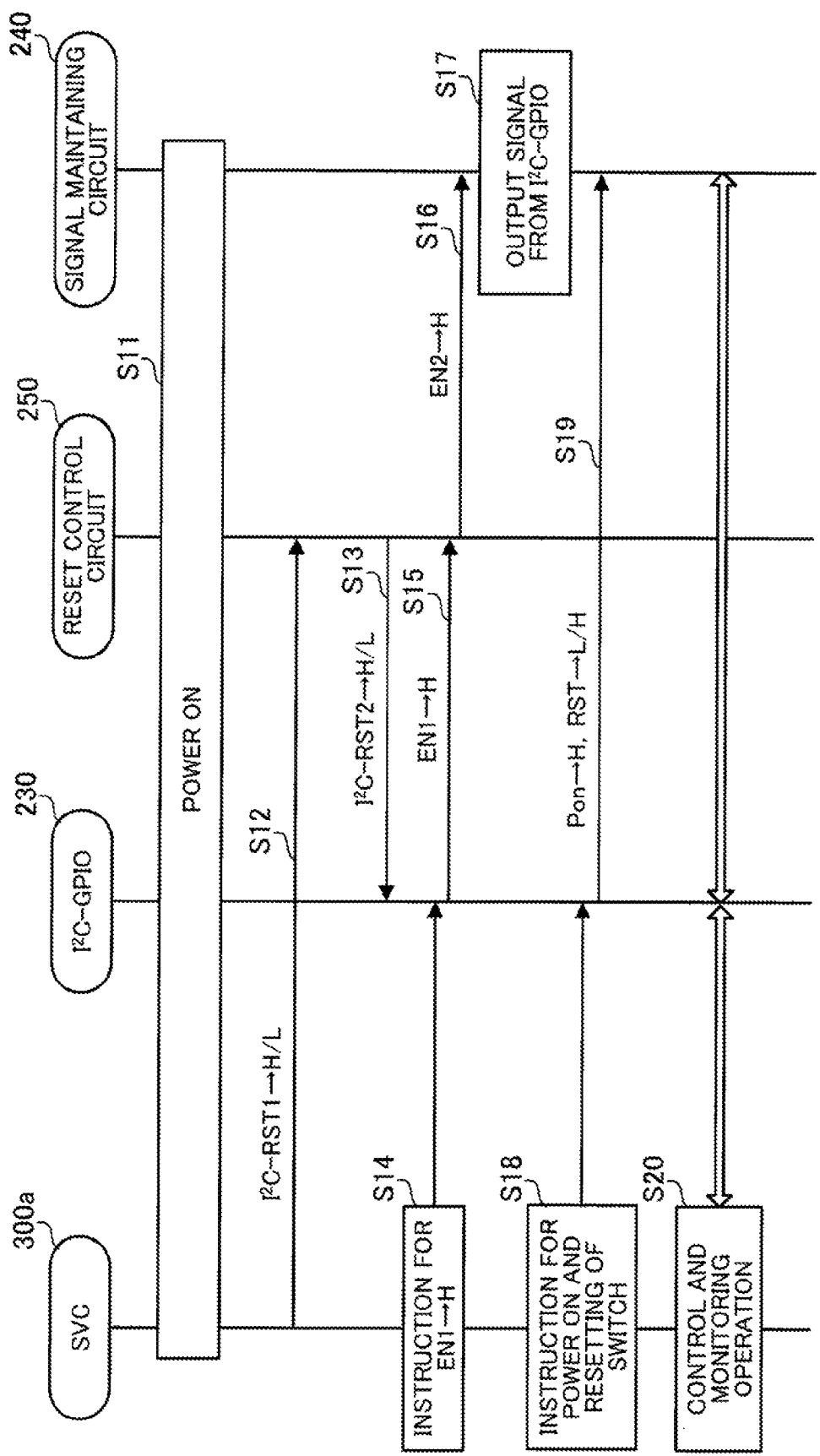

FIG. 9 is a sequence diagram illustrating an exemplary process performed in the case where the controller enclosure 110 is powered on.

(Step S11) The controller enclosure 110 is powered on in response to an operation performed on a power switch (not illustrated) of the controller enclosure 110. Then, the service controllers 300a and 300b and the I²C-GPIO 230 are activated. Further, a drive voltage is supplied to the DC/DC converter 220, the signal maintaining circuit 240, and the reset control circuit 250. In the following description, it is assumed that the service controller 300a operates as an active service controller.

(Step S12) In order to instruct resetting of the I²C-GPIO 230, the service controller 300a maintains the reset signal I²C-RST1 at high (H) level for a certain period of time, and then switches the reset signal I²C-RST1 to low (L) level.

(Step S13) After a certain period of time after the reset signal I²C-RST1 was switched to high level, the reset control circuit 250 switches the reset signal I²C-RST2 to high level. Thus, the I²C-GPIO 230 is reset. Further, after a certain period of time after the reset signal I²C-RST1 was switched to low level, the reset control circuit 250 switches the reset signal I²C-RST2 to low level.

It is to be noted that the operations in Steps S12 and S13 do not have to be performed as long as the I²C-GPIO 230 is successfully activated and both the reset signals I²C-RST1 and I²C-RST2 are low level at the time of starting Step S14.

(Step S14) The service controller 300a instructs the I²C-GPIO 230 to switch the enable signal EN1 to high level via the I²C bus 113.

(Step S15) The I²C-GPIO 230 switches the enable signal EN1 to high level in accordance with the instruction from the service controller 300a.

(Step S16) In response to the enable signal EN1 being switched to high level, the reset control circuit 250 switches the enable signal EN2 to high level.

(Step S17) In response to the enable signal EN2 being switched to high level, the signal maintaining circuit 240 is put in a state of outputting the control signals (the reset signal RST and the power-on signal Pon) from the I²C-GPIO 230 without any change. Thus, the service controller 300a becomes able to control the operations of the PCIe switch 210 and the DC/DC converter 220.

(Step S18) The service controller 300a instructs the I²C-GPIO 230 to power on and reset the PCIe switch 210 via the I²C bus 113.

(Step S19) The I²C-GPIO 230 switches the power-on signal Pon to high level in accordance with the instruction from the service controller 300a. Thus, the DC/DC converter 220 starts supplying a drive voltage to the PCIe switch 210. Further, the I²C-GPIO 230 maintains the reset signal RST at low level for a certain period of time, and then switches the reset signal RST to high level. Thus, the PCIe switch 210 is reset.

(Step S20) The service controller 300a starts an operation of controlling and monitoring the PCIe switch 210 and the DC/DC converter 220, which is performed by transmitting control signals via the I²C bus 113. For example, the service controller 300a loads state information indicating the states of the PCIe switch 210 and the DC/DC converter 220, which are circuits to be controlled and monitored, from the PCIe switch 210. The state information may include temperature information and drive voltage information. Then, if the service controller 300a determines that a failure has occurred in the circuit to be controlled and monitored, the service controller 300a performs a control operation of resetting the failed circuit or stopping the operations of the failed circuit, for example.

Figure 10:
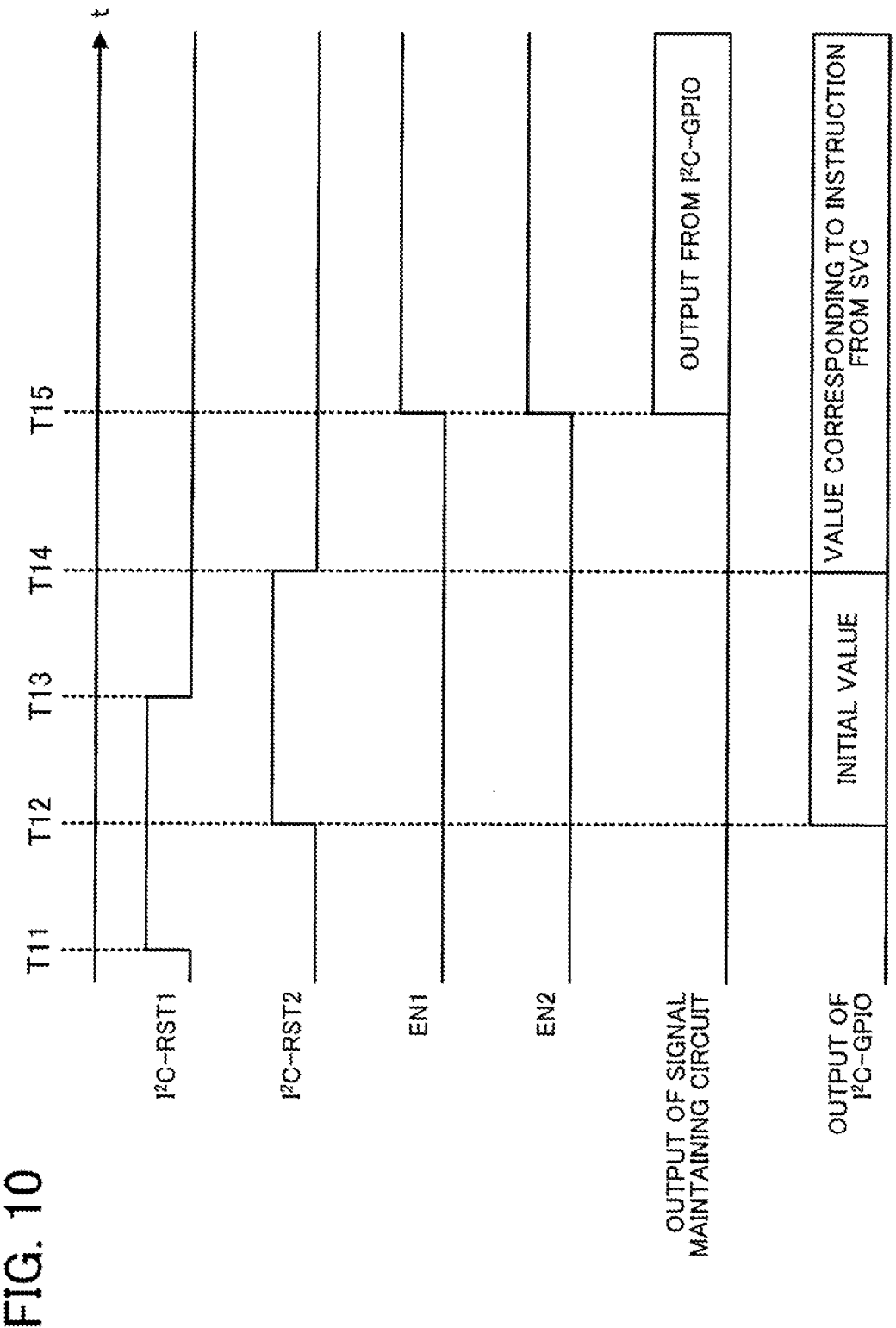

FIG. 10 is a timing chart illustrating an exemplary transition of the values of signals in the case where the controller enclosure is powered on.

With the operation in Step S12 of FIG. 9, the reset signal I²C-RST1 that is input to the reset control circuit 250 is maintained at high level during a period from a timing T11 to a timing T13. At a timing T12 after a certain period of time after the timing T11 at which the reset signal I²C-RST1 was switched to high level, the reset signal I²C-RST2 that is output from the reset control circuit 250 is switched to high level. Then, at a timing T14 after a certain period of time after the timing T13 at which the reset signal I²C-RST1 was switched to low level, the reset signal I²C-RST2 is switched to low level.

The I²C-GPIO 230 is reset at the timing T12 at which the reset signal I²C-RST2 is switched to high level. The I²C-GPIO 230 maintains the output values of the control signals at their predetermined initial values while the signal I²C-RST2 is high level, for example.

At a timing T15 after the I²C-GPIO 230 was reset, the I²C-GPIO 230 switches the enable signal EN1 to high level in accordance with an instruction from the service controller 300a. In response to the reset signal I²C-RST1 being low level and the enable signal EN1 being high level, the reset control circuit 250 switches the enable signal EN2 to high level. Thus, the signal maintaining circuit 240 is put in a state of outputting the control signals from the I²C-GPIO 230 without any change. It is to be noted that the signal maintaining circuit 240 maintains the output values of the control signals at predetermined initial values during a period from the power-on to the timing T15.

The above operations performed at the timing T15 correspond to the operations in Steps S13 through S17 of FIG. 9. After that, in accordance with an instruction of the service controller 300a, the PCIe switch 210 starts operating, and the service controller 300a monitors the operations of the PCIe switch 210.

Figure 11:
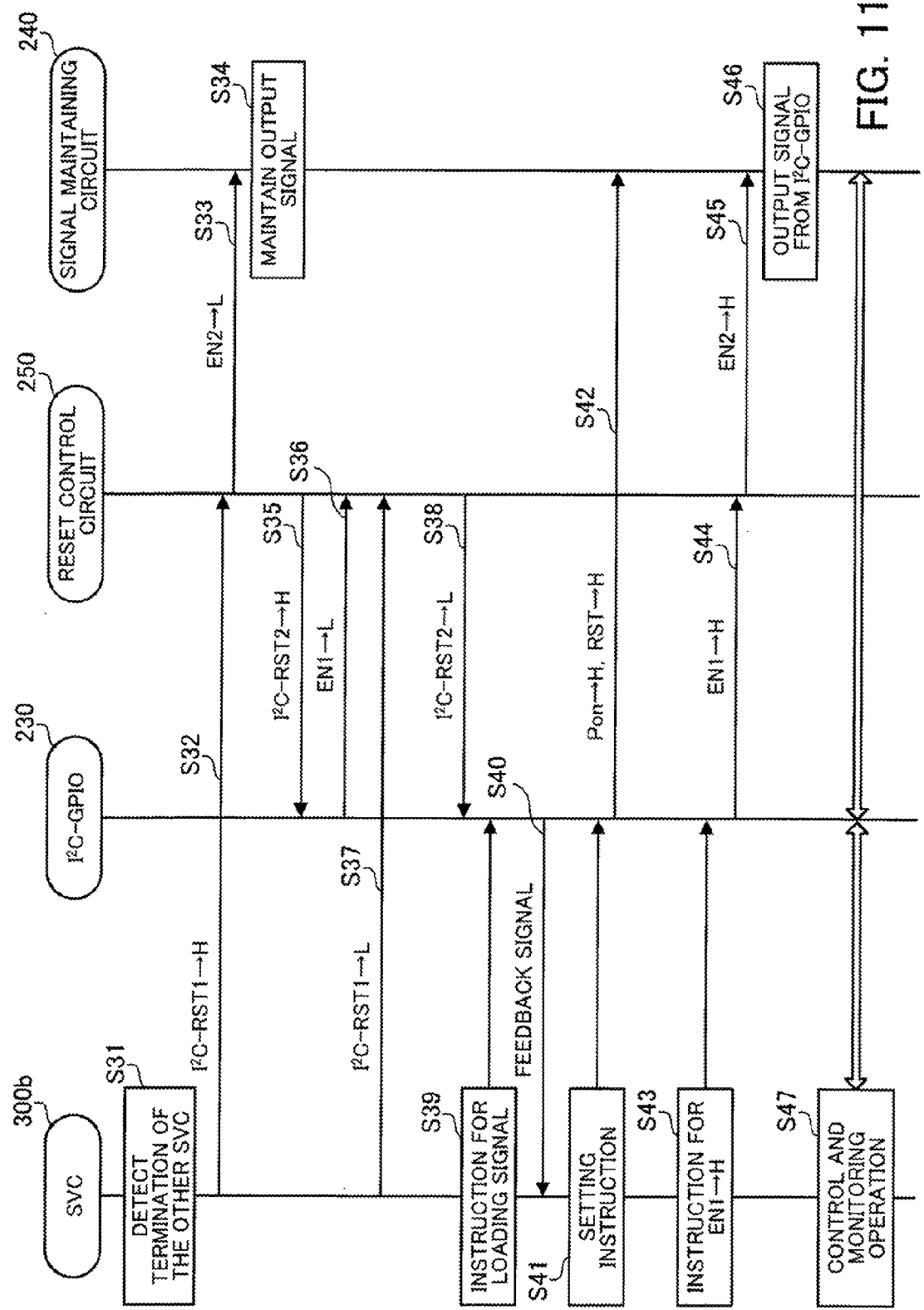
FIG. 11 is a sequence diagram illustrating an exemplary process performed in the case where an active service controller is abnormally terminated.

FIG. 11 is a sequence diagram illustrating an exemplary process performed in the case where the active service controller 300a is abnormally terminated.

(Step S31) The service controller 300b operating as a standby controller detects that the service controller 300a has been abnormally terminated, and starts operating as an active service controller. At this point, the I²C bus 113 is unusable.

(Step S32) In order to instruct resetting of the I²C-GPIO 230, the service controller 300b switches the reset signal I²C-RST1 to high level.

(Step S33) In response to the reset signal I²C-RST1 being switched to high level, the reset control circuit 250 switches the enable signal EN2 to low level.

(Step S34) The signal maintaining circuit 240 maintains the control signals (the reset signal RST and the power-on signal Pon) to be output at the values that has been input from the I²C-GPIO 230 at the time the enable signal EN2 is switched to the low level. In this embodiment, the signal maintaining circuit 240 maintains both the reset signal RST and the power-on signal Pon at high level.

(Step S35) After a certain period of time after the reset signal I²C-RST1 was switched to high level in Step S32, the reset control circuit 250 switches the reset signal I²C-RST2 to high level. Thus, the I²C-GPIO 230 is reset, and the I²C bus 113 is restored.

(Step S36) The I²C-GPIO 230a having been reset sets the value of the enable signal EN1 to low level, which is the initial value thereof.

(Step S37) The service controller 300b switches the reset signal I²C-RST1 to low level.

(Step S38) After a certain period of time after the reset signal I²C-RST1 was switched to low level, the reset control circuit 250 switches the reset signal I²C-RST2 to low level.

(Step S39) The service controller 300b instructs, via the I²C bus 113, the I²C-GPIO 230 to load the values of the control signals being fed back from the signal maintaining circuit 240 and to report the values.

(Step S40) In accordance with the instruction from the service controller 300b, the I²C-GPIO 230 loads the values of the control signals being fed back from the signal maintaining circuit 240. The values of the feedback signals loaded in this step are the values of the outputs that have been maintained by the signal maintaining circuit 240 from Step S34. That is, the values loaded in this step are the values that were output from the I²C-GPIO 230 at the time immediately before the termination of the service controller 300a. In this embodiment, the I²C-GPIO 230 loads "1" indicating high level as the value of the reset signal RST, and "1" indicating high level as the value of the power-on signal Pon. The I²C-GPIO 230 reports the loaded values of the feedback signals to the service controller 300b via the I²C bus 113.

It is to be noted that since the values of the control signals being output from the signal maintaining circuit 240 are fed back to the I²C-GPIO 230, the I²C-GPIO 230 may easily and reliably recognize the values of the control signals that the I²C-GPIO 230 was outputting before being reset.

(Step S41) The service controller 300b transmits the reported values of the feedback signals to the I²C-GPIO 230 via the I²C bus 113, and instructs the I²C-GPIO 230 to set again the transmitted values as the values of corresponding control signals.

(Step S42) In accordance with the instruction from the service controller 300b, the I²C-GPIO 230 sets the output values of both the reset signal RST and the power-on signal Pon to high level.

(Step S43) The service controller 300b instructs the I²C-GPIO 230 to switch the enable signal EN1 to high level via the I²C bus 113. The purpose of this operation is to return the states of the control signals transmitted from the I²C-GPIO 230 to the PCIe switch 210 and the DC/DC converter 220 via the signal maintaining circuit 240 to the state at the time immediately before the termination of the service controller 300a.

(Step S44) The I²C-GPIO 230 switches the enable signal EN1 to high level in accordance with the instruction from the service controller 300b.

(Step S45) In response to the enable signal EN1 being switched to the high level, the reset control circuit 250 switches the enable signal EN2 to high level.

(Step S46) In response to the enable signal EN2 being switched to high level, the signal maintaining circuit 240 terminates the operation of maintaining the output signals, and outputs the values of the control signals being output from the I²C-GPIO 230 without any change. At this point, the reset signal RST and the power-on signal Pon that are output from the signal maintaining circuit 240 become the same level, i.e., high level, as those at the time before the enable signal EN2 was switched to high level.

Since the reset control circuit 250 is configured to recognize, in response to the enable signal EN1 from the I²C-GPIO 230 being switched to high level, the timing of causing the signal maintaining circuit 240 to terminate the operation of maintaining the output signals, the reset control circuit 250 may recognize this timing even when the reset control circuit 250 is not connected to the I²C bus 113. Accordingly, the configuration of the reset control circuit 250 may be simplified.

It is to be noted that, after the output values of the reset signal RST and the power-on signal Pon are both set to high level in Step S42, the I²C-GPIO 230 may autonomously switch the enable signal EN1 to high level without receiving an instruction from the service controller 300b, for example.

With the operations up to Step S46, during a period from the termination of the service controller 300b to Step S46, both the reset signal RST and the power-on signal Pon that are output from the signal maintaining circuit 240 are maintained at high level. Therefore, the termination of the service controller 300b and the operation of resetting the I²C-GPIO 230 for releasing the I²C bus 113 do not affect the signal relay operation of the PCIe switch 210. This allows the PCIe switch 210 to continue the signal relay operation, and also allows the I²C-controller modules 111a and 111b to normally continue the I/O access control operation.

(Step S47) The service controller 300b starts an operation of controlling and monitoring the PCIe switch 210 and the DC/DC converter 220 by transmitting control signals via the I²C bus 113. That is, the service controller 300b takes over the control and monitoring operation that has been performed by the service controller 300a.

It is to be noted that, in the operations of FIG. 11 described above, the I²C-GPIO 230 loads the values of the feedback signals from the signal maintaining circuit 240 and reports the loaded values to the service controller 300b in accordance with an instruction from the service controller 300b (Steps S39 and S40), and then sets the values reported from the service controller 300b as the output values of the control signals (Steps S41, and S42). However, after loading the feedback signals, the I²C-GPIO 230 may set the loaded values as the output values of the control signals without waiting for an instruction from the service controller 300b, for example.

Further, in an alternative configuration, the I²C-GPIO 230 does not have a function of loading the values of the feedback signals from the signal maintaining circuit 240. In this case, the standby service controller 300b monitors control signals transmitted from the active service controller 300a to the I²C-GPIO 230, and records the history of these control signals in the RAM. When the service controller 300b detects that the service controller 300a has been terminated, the service controller 300b analyzes the history recorded in the RAM, and determines the last values of the reset signal RST and the power-on signal Pon output from the I²C-GPIO 230. The service controller 300b transmits a control signal that sets the reset signal RST and the power-on signal Pon to the determined last values to the I²C-GPIO 230 via the I²C bus 113. Thus, it is possible to match the values of the reset signal RST and the power-on signal Pon that are output from the signal maintaining circuit 240 and the values of the reset signal RST and the power-on signal Pon that are output from the I²C-GPIO 230, immediately before the operation of maintaining the output signals in the signal maintaining circuit 240 is cancelled in Step S46.

FIG. 12 is a timing chart illustrating an exemplary transition of the values of signals in the case where the active service controller is abnormally terminated.

With the operation in Step S32 of FIG. 11, the reset signal I²C-RST1 that is input to the reset control circuit 250 becomes high level at a timing T21. In response to the reset signal I²C-RST1 being switched to high level, the reset control circuit 250 switches the enable signal EN2 to low level. The signal maintaining circuit 240 maintains the value of each of the reset signal RST and the power-on signal Pon at the value (high level) that has been input from the I²C-GPIO 230 at the timing T21.

Further, at a timing T22 after a predetermined time period after the reset signal I²C-RST1 was switched to high level, the reset control circuit 250 switches the reset signal I²C-RST2 to high level. Thus, the I²C-GPIO 230 is reset, and the I²C bus 113 is restored. The I²C-GPIO 230a having been reset sets the value of the enable signal EN1 to low level, and sets the output values of the control signals to their predetermined initial values.

With the operation in Step S37 of FIG. 11, the reset signal I²C-RST1 that is input to the reset control circuit 250 becomes low level at a timing T23. At a timing T24 after a predetermined time period after the reset signal I²C-RST1 was switched to low level, the reset control circuit 250 switches the reset signal I²C-RST2 to low level. The I²C-GPIO 230 is switched from the state of setting the output values of the control signals to their initial values to the state of outputting control signals corresponding to the instruction from the service controller 300b.

With the operations in Steps S39 through S41 of FIG. 11, at a timing T25, the I²C-GPIO 230 switches the values of the reset signal RST and the power-on signal Pon to be output to the values that had been output before the I²C-GPIO 230 was reset. Subsequently, at a timing T26, the I²C-GPIO 230 switches the enable signal EN1 to high level in accordance with the instruction from the service controller 300b. In response to the reset signal I²C-RST1 being low level and the enable signal EN1 being high level, the reset control circuit 250 switches the enable signal EN2 to high level. Thus, the signal maintaining circuit 240 terminates the operation of maintaining the output signals, and outputs the values of the control signals being output from the I²C-GPIO 230 without any change. At this point, the values of the reset signal RST and the power-on signal Pon that are output from the signal maintaining circuit 240 become high level, i.e., the same level as those at the time before the enable signal EN2 was switched to high level.

Subsequently, at a timing T27, the service controller 300b starts a monitoring operation of the PCIe switch 210, which is performed by transmitting a control signal via the I²C bus 113. The I²C-GPIO 230 outputs a control signal corresponding to an instruction from the service controller 300b, and the signal maintaining circuit 240 outputs the control signal output from the I²C-GPIO 230 without any change.

In the second embodiment described above, when the I²C bus 113 becomes unusable due to an abnormal termination of the service controller 300a, the values of control signals being output to the PCIe switch 210 and the DC/DC converter 220 are maintained by the signal maintaining circuit 240 in accordance with a reset instruction from the service controller 300b. Then, while the output values of the control signals are maintained by the signal maintaining circuit 240, the I²C-GPIO 230 is reset, and thus the I²C bus 113 is restored. Accordingly, the PCIe switch 210 may normally continue the operation of relaying signals between the controller module 111a and the controller module 111b even during a process of restoring the I²C bus 113.

Further, after the I²C bus 113 is restored, the I²C-GPIO 230 is controlled so as to output control signals having the same values as those before the resetting of the I²C-GPIO 230. Therefore, it is possible to restore the operational states of the I²C-GPIO 230 and the signal maintaining circuit 240 to the states before the termination of the service controller 300a. Thus, the service controller 300b having become active may take over the operation of controlling and monitoring the PCIe switch 210.

In one embodiment, an electronic circuit to be controlled may continue operations even during a process of restoring a bus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control system comprising:
   an electronic circuit;
   a bus interface that receives, via a bus, a control signal for controlling the electronic circuit, and outputs a signal corresponding to the received control signal to the electronic circuit;
   a signal maintaining circuit that maintains a value of the signal to be output from the bus interface to the electronic circuit;
   a reset control circuit that causes, upon detecting that an output operation of the control signal by a control device has been terminated, the signal maintaining circuit to maintain the value of the output signal to the electronic circuit, and subsequently resets the bus interface; and
   the control device that controls the electronic circuit by outputting the control signal via the bus.

2. The control system according to claim 1, wherein the control device includes
   a first control device; and
   a second control device that outputs, upon detecting that operations of the first control device have been terminated, a reset instruction via a reset signal line, and subsequently controls the electronic circuit in place of the first control device; and
   wherein the reset control circuit causes, upon receiving the reset instruction via the reset signal line, the signal maintaining circuit to maintain the value of the output signal to the electronic circuit, and subsequently resets the bus interface.

3. The control system according to claim 1, wherein the signal maintaining circuit maintains, as the signal to be output from the bus interface to the electronic circuit, a value of a signal for instructing the electronic circuit to perform resetting.

4. The control system according to claim 1, wherein the signal maintaining circuit maintains, as the signal to be output from the bus interface to the electronic circuit, a value of a signal for instructing on and off of power supply to the electronic circuit.

5. The control system according to claim 2, wherein the bus interface outputs, after being reset by the reset control circuit, again to the signal maintaining circuit a value of a signal being output from the signal maintaining circuit to the electronic circuit, in accordance with an instruction from the second control device via the bus.

6. The control system according to claim 5, wherein the bus interface outputs again to the signal maintaining circuit the value of the signal being output from the signal maintaining circuit to the electronic circuit, by loading the value of the signal being output from the signal maintaining circuit to the electronic circuit and outputting the loaded value of the signal to the signal maintaining circuit.

7. The control system according to claim 5, wherein after the bus interface has output again to the signal maintaining circuit the value of the signal being output from the signal maintaining circuit to the electronic circuit, the reset control circuit releases the signal maintaining circuit from a state of maintaining the value of the output signal to the electronic circuit.

8. The control system according to claim 7,
   wherein the second control device instructs the bus interface via the bus to output again to the signal maintaining circuit the value of the signal being output from the signal maintaining circuit to the electronic circuit, and subsequently transmits to the bus interface via the bus a release instruction for releasing the signal maintaining circuit from the state of maintaining the value of the output signal; and
   wherein the reset control circuit releases, in response to reception of the release instruction by the bus interface, the signal maintaining circuit from the state of maintaining the value of the output signal to the electronic circuit.

9. A relay apparatus comprising:
   a relay circuit that relays signals transmitted and received between a plurality of information processing apparatuses;
   a bus interface that receives, via a bus, a control signal for controlling the relay circuit, and outputs a signal corresponding to the received control signal to the relay circuit;
   a signal maintaining circuit that maintains a value of the signal to be output from the bus interface to the relay circuit; and a reset control circuit that causes, upon detecting that an output operation of the control signal to the bus interface has been terminated, the signal maintaining circuit to maintain the value of the output signal to the relay circuit, and subsequently resets the bus interface.

10. The relay apparatus according to claim 9, wherein the reset control circuit causes, upon receiving a reset instruction via a reset signal line from a control device connected to the bus, the signal maintaining circuit to maintain the value of the output signal to the relay circuit, and subsequently resets the bus interface.

11. The relay apparatus according to claim 10, wherein the bus interface outputs, after being reset by the reset control circuit, again to the signal maintaining circuit a value of a signal being output from the signal maintaining circuit to the relay circuit, in accordance with an instruction from the control device via the bus.

12. The relay apparatus according to claim 10, wherein the signal maintaining circuit maintains, as the signal to be output from the bus interface to the relay circuit, a value of a signal for instructing the relay circuit to perform resetting.

13. The relay apparatus according to claim 10, wherein the signal maintaining circuit maintains, as the signal to be output from the bus interface to the relay circuit, a value of a signal for instructing on and off of power supply to the relay circuit.

14. The relay apparatus according to claim 11, wherein the bus interface outputs again to the signal maintaining circuit the value of the signal being output from the signal maintaining circuit to the relay circuit, by loading the value of the signal being output from the signal maintaining circuit to the relay circuit and outputting the loaded value of the signal to the signal maintaining circuit.

15. The relay apparatus according to claim 11, wherein after the bus interface has output again to the signal maintaining circuit the value of the signal being output from the signal maintaining circuit to the relay circuit, the reset control circuit releases the signal maintaining circuit from a state of maintaining the value of the output signal to the relay circuit.

16. The relay apparatus according to claim 15,
wherein the bus interface is instructed by the control device via the bus to output again to the signal maintaining circuit the value of the signal being output from the signal maintaining circuit to the relay circuit, and subsequently receives from the control device via the bus a release instruction for releasing the signal maintaining circuit from the state of maintaining the value of the output signal; and
wherein the reset control circuit releases, in response to reception of the release instruction by the bus interface, the signal maintaining circuit from the state of maintaining the value of the output signal to the relay circuit.

* * * * *